July 8, 1958

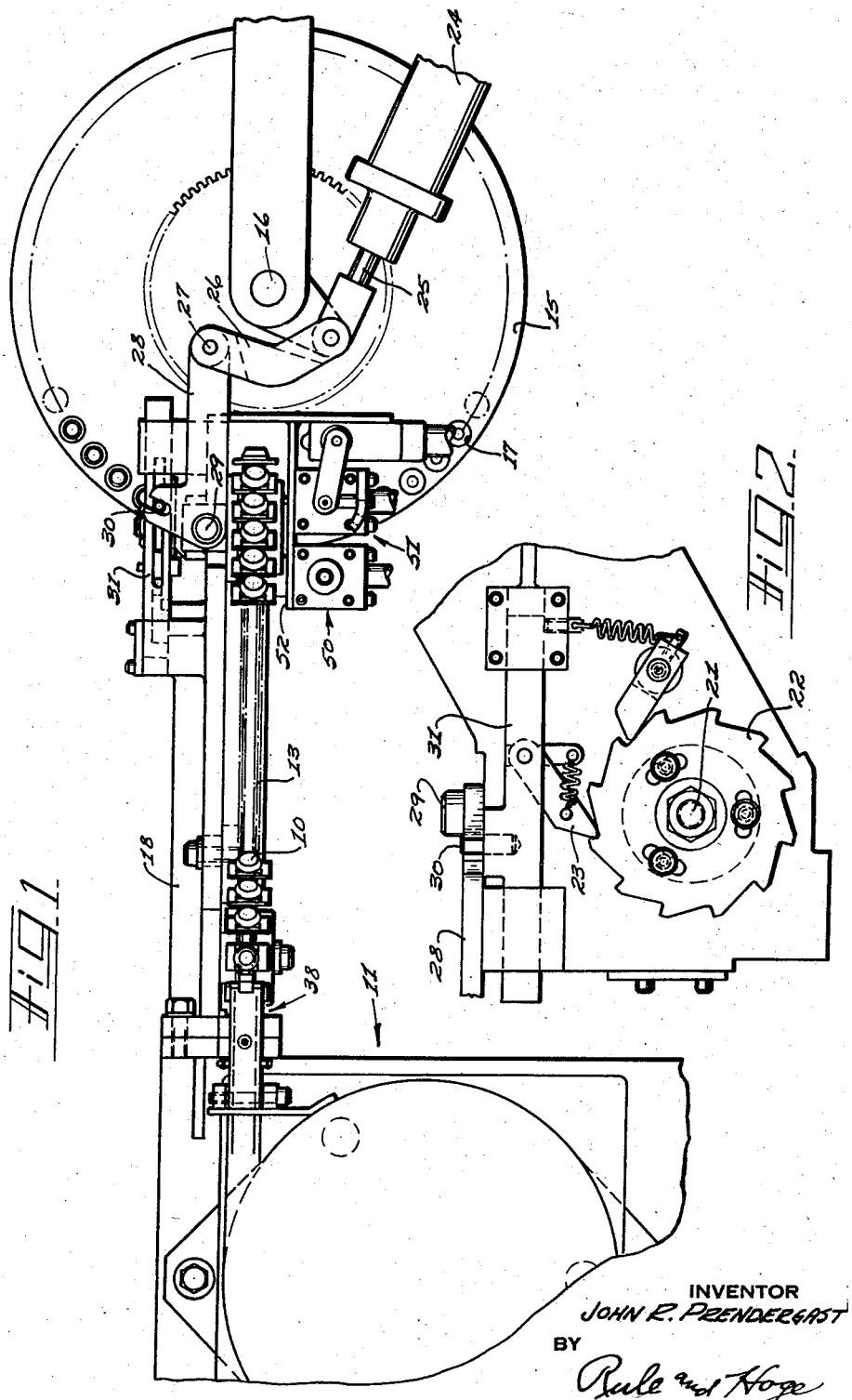

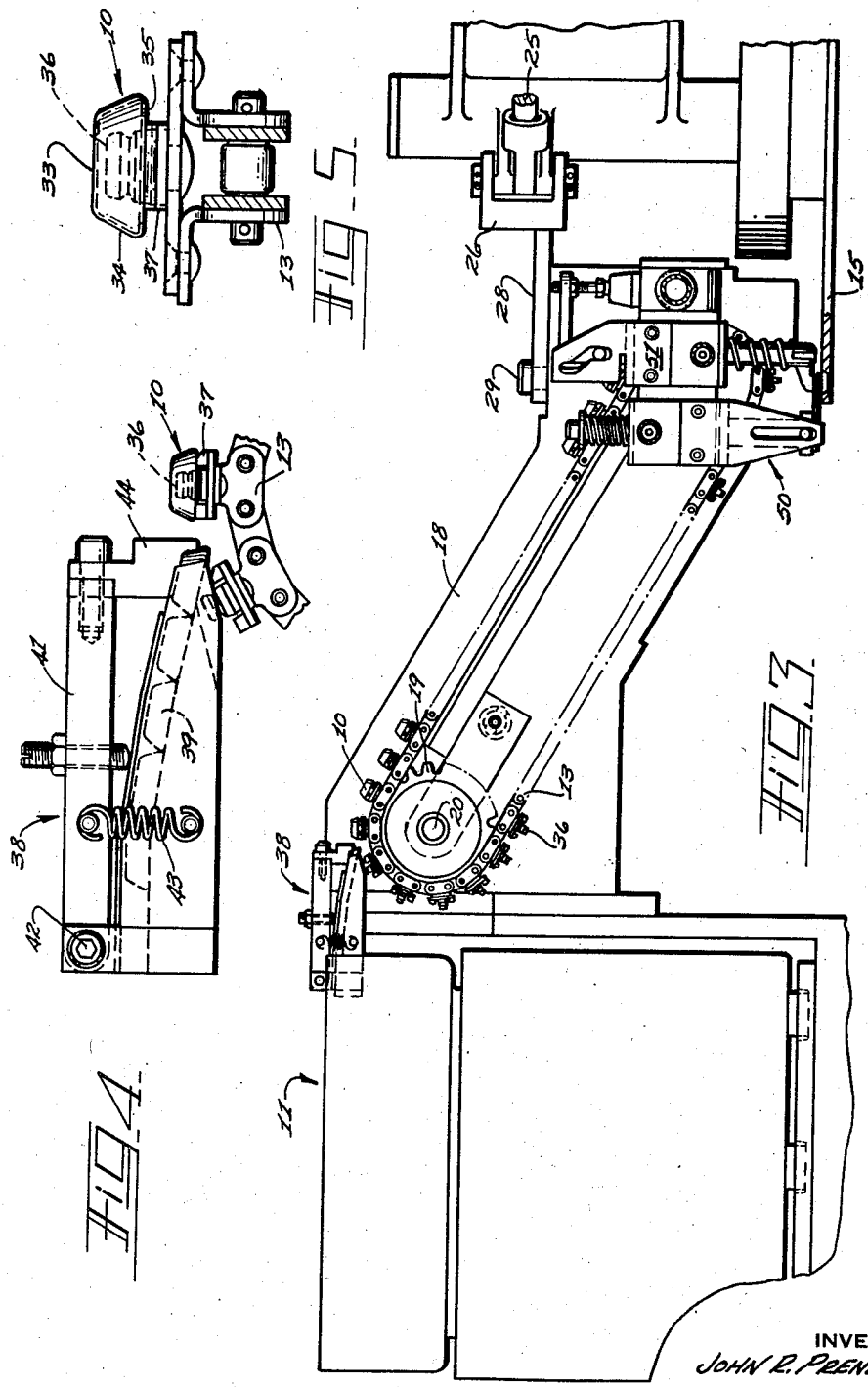

J. R. PRENDERGAST 2,842,252

APPARATUS FOR TRANSFERRING AND LOADING
ANODE BUTTONS ON A CARRIER

Filed May 16, 1955

INVENTOR
JOHN R. PRENDERGAST
BY
Rule and Hoge.

July 8, 1958

J. R. PRENDERGAST 2,842,252

APPARATUS FOR TRANSFERRING AND LOADING
ANODE BUTTONS ON A CARRIER

Filed May 16, 1955

INVENTOR
JOHN R. PRENDERGAST
BY Rule and Hoge

United States Patent Office 2,842,252
Patented July 8, 1958

2,842,252
APPARATUS FOR TRANSFERRING AND LOADING ANODE BUTTONS ON A CARRIER

John R. Prendergast, Toledo, Ohio, assignor to Owens-Illinois Glass Company, a corporation of Ohio Application May 16, 1955, Serial No. 508,682

8 Claims. (Cl. 198—24)

My invention relates to apparatus for transferring metal parts, such as used for anodes in cathode ray tubes, from a hopper to a conveyor and from the conveyor to a carrier plate. In the manufacture of certain types of cathode ray tubes, metal parts serving as anode buttons are inserted and welded in openings in the glass wall of the tube. The present invention relates to apparatus by which such buttons are transferred from a hopper to a traveling conveyor, carried thereby to a loading station and there transferred from the conveyor to a horizontal carrier plate. The buttons are placed in sockets or openings formed in the carrier plate. The invention provides means for automatically transferring the buttons from a container and accurately placing them in position in the sockets in the carrier plate.

Referring to the accompanying drawings which illustrate a preferred form of the apparatus for use in practicing the invention:

Fig. 1 is a plan view of the apparatus;

Fig. 2 is a fragmentary view showing a pawl and ratchet device for intermittently driving the chain conveyor;

Fig. 3 is a side elevational view of the apparatus shown in Fig. 1;

Fig. 4 is an elevational view of a shutter device controlling the transfer of the buttons from a hopper to the chain conveyor;

Fig. 5 is a cross-sectional view of the chain conveyor, showing a button thereon;

Figure 6:
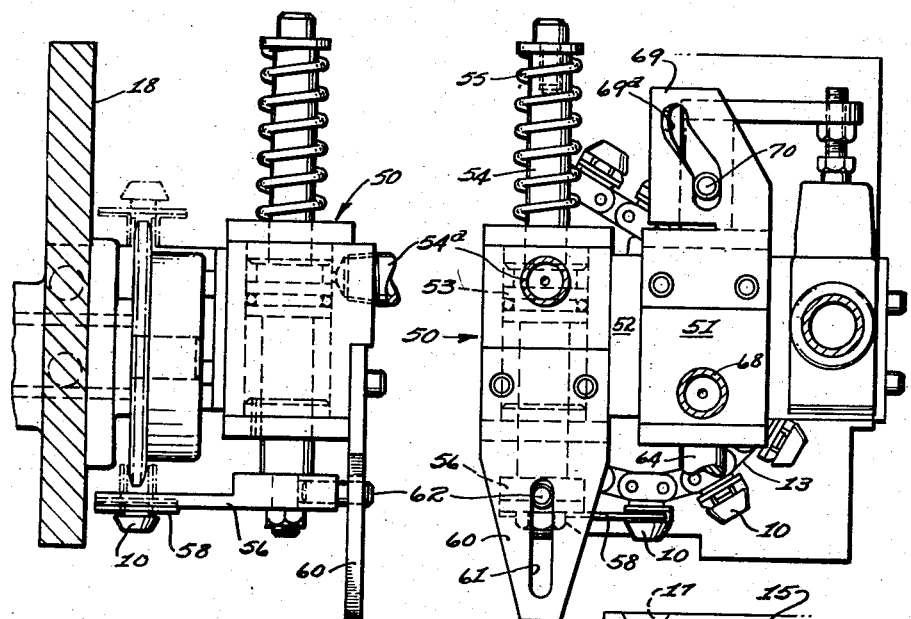
Fig. 6 is a cross-sectional elevation showing mechanism by which the buttons are transferred from the chain conveyor to the carrier plate.

Referring to Figs. 1 and 3, the anode buttons 10 which are placed in a hopper 11, are fed from the hopper to an endless chain conveyor 13 by which the buttons are carried forwardly and downwardly to a loading station at which they are transferred to a carrier 15. The carrier 15 is in the form of a horizontal disk mounted on a shaft 16 for step-by-step rotation. The carrier plate 15 is formed with an annular series of sockets 17 to receive the buttons 10. The sockets 17 are in the form of openings extending through the carrier plate and having downwardly convergent tapered walls.

The endless chain conveyor 13 is trained over sprocket gears mounted in the conveyor frame 18, the gears including a sprocket wheel 19 mounted on a shaft 20 at the upper end of the conveyor frame 18 and a drive sprocket at the lower end of the conveyor keyed to a drive shaft 21 (Fig. 2). Means for intermittently driving the chain conveyor includes a pawl and ratchet mechanism as shown in Fig. 2 comprising a ratchet wheel 22 and a driving dog or pawl 23. The driving means includes an air cylinder 24 (Fig. 1) the piston rod 25 of which is pivoted to a link 26 at one end thereof. The other end of the link is connected by a pivot 27 to a rock arm 28 mounted to swing about a stationary pivot 29. The arm 28 has a slot and pin connection 30 with a slide bar 31 to which the dog 23 is pivoted.

The cylinder 24 is operated periodically under the control of timer mechanism (not shown), thereby rotating the ratchet 22 step by step. Each such step movement brings a button 10 at the lower end of the conveyor into position to be transferred to the disk carrier 15 as hereinafter described. The cylinder 24 is also operatively connected for rotating the carrier 15 step by step. The operating connection between the cylinder 24 and the carrier 15 may be the same as fully disclosed in the copending application of Sheets and Stutske, Serial No. 399,053, filed December 18, 1953, Apparatus for Handling Anode Buttons for Glass Cathode Ray Tubes.

The buttons 10 are made of sheet metal and are of hollow frustum formation. As shown, for example, in Fig. 5 the button comprises a circular top 33, downwardly flared side walls 34, and an inturned rim or flange 35. The conveyor 13 carries a series of button holding devices 36 in the form of lugs or posts on which the buttons 10 are held during transfer from the hopper 11 to the loading station at the lower end of the conveyor. Each of the posts 36 has attached thereto a permanent magnet 37 by which the buttons 10 are held on the post during their travel with the conveyor.

The buttons 10 are fed from the hopper 11 to a shutter device 38 (Fig. 4) formed with an inclined runway 39 through which the buttons 10 move in a row. An arm 41 connected to swing about a pivot 42 is yieldingly held in a stop position by a tension coil spring 43, said arm carrying a stop 44 to restrain the buttons. The holding posts 36 on the chain conveyor as they move forward beneath the device 38 engage the buttons 10 and transfer them to the chain conveyor.

Figure 7:
Fig. 7 is a front elevation of the same.
Figure 8:
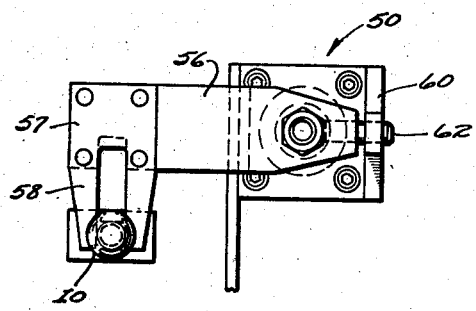
Fig. 8 is a bottom plan view of parts shown in Fig. 6.

The mechanism for transferring the buttons 10 from the conveyor 13 to the carrier plate 15 is as follows: Vertically disposed air operated cylinders or piston motors 50 and 51 are mounted on a stationary bracket or frame 52 adjacent to the lower end of the chain conveyor. The motor 50 comprises a piston 53 and piston rod 54. The piston is normally held in its upper position by a coil compression spring 55 mounted on the rod 54 and is driven downward by air pressure supplied through a pipe 54ª. Attached to the lower end of the piston rod is a horizontally disposed stripper bar 56. Attached to the outer end of this bar is a forked stripper plate 57 with laterally projecting fingers 58. These fingers are in the path of the buttons 10 on the conveyor chain while the stripper plate is in its lifted position (Figs. 6, 7). The fingers 58 are spaced apart a sufficient distance to straddle the post 36 with a button 10. Each step movement of the conveyor chain advances the lowermost button thereon (Figs. 6 and 7) to a position in which the fingers 58 straddle the post, with the fingers directly over the button. When the motor piston 53 is moved downward, the stripper bar 56 moves the button downwardly, stripping it from the post 36 so that it is positively positioned in a socket 17 directly therebeneath. The piston rod 54 and stripper bar 56 are held against rotative movement by a stationary plate 60 formed with a vertical slot 61. A lug 62 attached to the bar 56 projects into the slot 61, thus preventing horizontal movement of the stripper bar 56.

Figure 9:
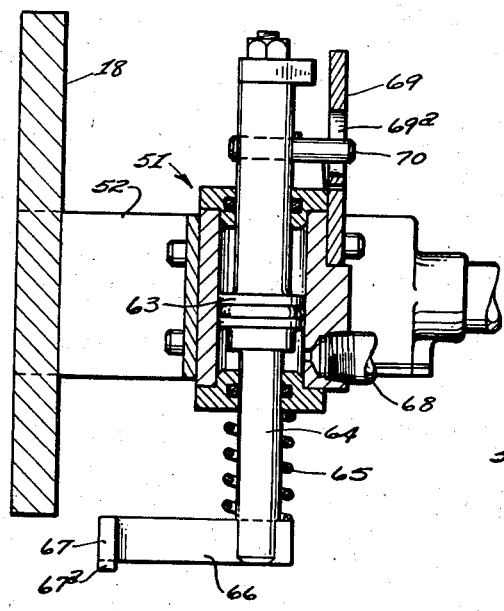
Fig. 9 is a sectional elevation showing an arm and its operating motor for holding the buttons in position on the carrier plate.

The motor 51 comprises a piston 63 (Fig. 9) and piston rod 64. A coil compression spring 65 normally holds the piston in its lowered position while air pressure to the motor is cut off. Attached to the piston rod 64 at the lower end thereof is a clamping arm 66 extending horizontally from the piston rod and formed at its free end with a lateral extension or clamping finger 67. Air pressure for lifting the piston 63 is supplied through a pipe 68. The piston rod and arm 66 attached thereto are rocked about the axis of the piston rod during their up-and-down movement. This rocking movement is produced by a stationary cam plate 69 formed with a cam slot 69a. A pin 70 attached to the piston rod extends into the cam slot.

Figure 10:
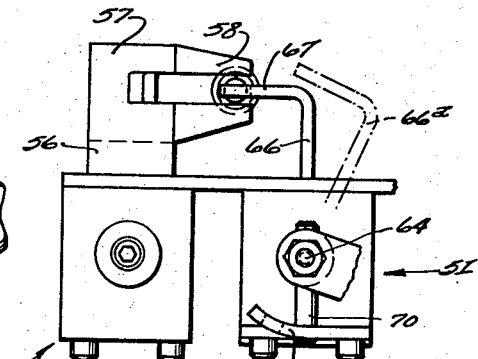
Fig. 10 is a top plan view of the mechanism shown in Fig. 9 and associated parts.
Figure 11:
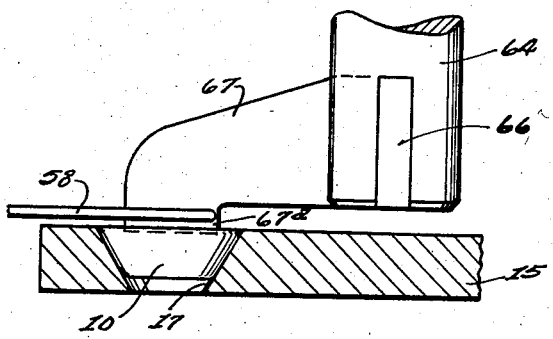
Fig. 11 is a fragmentary view showing the button holding arm and carrier plate.

While the piston rod is in its lifted position the arm 66 is in the retracted position 66a shown in broken lines (Fig. 10). When the air pressure is cut off from the motor 51 the spring 65 lowers the piston rod and arm 66 and swings the arm to the full line position (Fig. 10). This takes place while the stripper 56 is in its lowered position so that the clamping finger 67 is carried over the button 10 which has just been deposited in a socket 17 in the plate 15. The arm 66 during its final downward movement carries the finger 67 vertically downward between the fingers 58 of the stripper plate into contact with the button. The clamping finger 67 is formed at its free end with a downwardly extended portion 67a with a flat bottom surface for holding and leveling the button in the plate 15 while the stripper 56 is withdrawn.

The operation may be summarized as follows: The endless conveyor chain is moved intermittently step by step by the piston motor 24 operating through the pawl and ratchet drive mechanism (Fig. 2). The motor 24 at the same time indexes the disk carrier 15. Each step movement of the chain causes a post 36 thereon to engage a button 10 (Fig. 4) and withdraw it from the shutter device 38. The buttons are held on the posts by the magnets 37 until they reach their lowermost position (Fig. 7). The movement of the button to this position carries it beneath the stripper bar 56, with the fingers 58 straddling the post 36 which carries the button. While the chain conveyor is at rest in this position the motor 50 operates to move this stripper plate 56 downward, releasing the button from the conveyor chain so that the button moves downward into a socket 17 of the transfer disk. The pusher plate 56 also moves downward so that in its lowered position it overlies the button within the socket 17 and positions or holds the button level within its socket. While the stripper bar is in this lowered position the piston motor 51 operates to lower the holding arm 66, the arm being lowered by the spring 65. As the arm 66 moves downward it is swung inwardly to bring the extension 67 (Fig. 10) over the button which has just been deposited in the socket 17, the arm then holding the button in position while the stripper bar is withdrawn upwardly by its motor. This completes the cycle of operations.

Modifications may be resorted to within the spirit and scope of my invention.

I claim:

1. The combination of a conveyor mechanism including an endless conveyor chain, a conveyor frame and gears journalled for rotation about horizontal axes in said frame and over which the conveyor chain is trained, button holders mounted on the chain and uniformly spaced lengthwise thereof, means for driving the conveyor chain intermittently step by step and bringing the said holders with buttons thereon in succession to a discharge position, a stripper device comprising stripper fingers in position to straddle a holder at said station with said fingers between the conveyor chain and the button on said holder, means operable while the conveyor is at rest to move said stripper fingers outwardly from the conveyor and thereby strip the button from the holder, a carrier in position to receive the button when it is stripped from the holder, a clamping finger, and automatic means for moving the clamping finger into position to hold the button on the carrier while the stripper fingers are withdrawn.

2. The apparatus defined in claim 1 including magnets individual to said holders and by which the buttons are held on said holders.

3. The apparatus defined in claim 1, the means for operating the stripper fingers comprising a piston motor including a piston and piston rod, the said stripper fingers being attached to said rod for movement therewith.

4. The combination of a conveyor, button holders thereon, means for driving the conveyor and bringing the button holders each with a button thereon in succession to a discharge station at which the button and holder are on the under side of the conveyor, means for stripping the buttons from the holders comprising a piston motor including a vertical piston rod, a stripper attached to the piston rod and projecting into position to be brought between the conveyor and a button thereon as the latter is brought to said discharge station, said motor operable to move the stripper downwardly and thereby strip the button from the holder, a carrier plate extending beneath the path of the buttons at said station and formed with sockets in position to receive the buttons as they are stripped from the holders, a second piston motor comprising a vertical piston rod, a clamping arm mounted on said piston rod, said arm movable by the piston rod downward and into engagement with the buttons in said sockets and holding the buttons in place while the stripper bar is withdrawn.

5. The apparatus defined in claim 4 including means for rocking said last mentioned piston rod about its axis during its downward movement and thereby swinging the clamping arm laterally to a position over a button in the socket.

6. The combination with a traveling conveyor and means for driving the conveyor, of means for holding buttons on the conveyor and bringing them in succession to a transfer station, a stripper device at said station in a position behind each button as the latter is brought to said station, means for moving the stripper device outwardly from the conveyor and thereby withdrawing the button from the conveyor and thereafter returning the stripper device, a carrier in position to receive the button as it is withdrawn from the conveyor, a clamping device, and means for moving the clamping device over the button and holding the latter on the carrier while said stripper device is withdrawn.

7. Apparatus for conveying buttons and loading them on to a carrier, said apparatus comprising an endless conveyor chain, sprocket wheels mounted for rotation about horizontal axes and over which the conveyor chain is trained, button holders attached to the chain at intervals lengthwise thereof, means for driving the chain intermittently step by step and thereby bringing the holders with the buttons thereon to a loading station at which the buttons are positioned beneath the chain, a stripper device comprising a stripper plate, means for holding the stripper plate stationary in a position to be brought between the conveyor chain and the button thereon at said station by the movement of the chain, means for moving the stripper device downwardly while the chain is stationary and thereby stripping the button from the holder, and then withdrawing the stripper device upwardly, a carrier plate mounted beneath said conveyor and formed with sockets, means for moving the carrier plate intermittently in synchronism with the intermittent movements of the conveyor chain and thereby bringing the sockets in succession to the loading station and holding the sockets stationary beneath the holders in position to receive the buttons as they are stripped from the holders, a clamping device, and means for moving the clamping device into clamping position over the button in the socket at the loading station while the stripper device is in its lowered position and holding the clamping device in said clamping position while the stripper device is withdrawn upward.

8. The combination of a conveyor, button holders on the conveyor, a horizontal carrier plate with sockets therein, automatic means for driving the conveyor and the carrier plate including interconnected means by which the button holders and sockets are brought to a transfer position with a button holder over and spaced above a socket in the carrier plate, a stripper means for positioning the stripper over a button on the holder at the transfer position, means for then moving the stripper downwardly and thereby stripping the button from the holder and dropping it into the socket at said transfer position, a clamping arm, automatic means for moving the clamping arm downward into engagement with the button in the socket after and in timed relation to the downward movement of the stripper and holding the button in the socket, and means for withdrawing the stripper while the clamping arm is in its lowered position.

References Cited in the file of this patent

UNITED STATES PATENTS

| | | |
|---|---|---|
| 976,483 | Mitchell | Nov. 22, 1910 |
| 1,820,182 | Cooper | Aug. 25, 1931 |
| 2,157,110 | Bock et al. | May 9, 1939 |
| 2,351,200 | George et al. | June 13, 1944 |
| 2,384,033 | Jacobson | Sept. 4, 1945 |
| 2,662,344 | Knox | Dec. 15, 1953 |
| 2,668,002 | Temple | Feb. 2, 1954 |